United States Patent [19]
Ormond

[11] 3,911,737
[45] Oct. 14, 1975

[54] HEAVY DUTY LOAD CELL
[76] Inventor: Alfred Newman Ormond, 11969 Rivera Rd., Santa Fe Springs, Calif. 90670
[22] Filed: June 27, 1974
[21] Appl. No.: 483,609

[52] U.S. Cl. .............................................. 73/141 A
[51] Int. Cl.² ......................................... G01L 1/22
[58] Field of Search .................................. 73/141 A

[56] References Cited
UNITED STATES PATENTS

| | | | |
|---|---|---|---|
| 2,458,481 | 1/1949 | Ruge | 73/141 A |
| 2,487,595 | 11/1949 | Ruge | 73/141 A |
| 3,091,961 | 6/1963 | Piell | 73/141 A |
| 3,237,450 | 3/1966 | Brooks, Jr. | 73/141 A |

*Primary Examiner*—Charles A. Ruehl
*Attorney, Agent, or Firm*—Ralph B. Pastoriza

[57] ABSTRACT

The load cell is particularly useful for measuring tension in a crane cable and comprises a body having its opposite ends connected in the cable so that a tension force is applied thereto. A central circumferential portion of the body is recessed to leave a central axial column connecting the end portions. A ring coaxially surrounds the column and is rigidly connected at its inner opposite ends over 360° to the opposed opposite end portions of the body. A strain gauge is secured to the central integral column and connected to a read out device. The major portion of the axial load is carried by the ring and extraneous torsion, bending and side load components are absorbed in the ring so that a true measure of the axial force is determined by measuring the strain in the central column.

6 Claims, 3 Drawing Figures

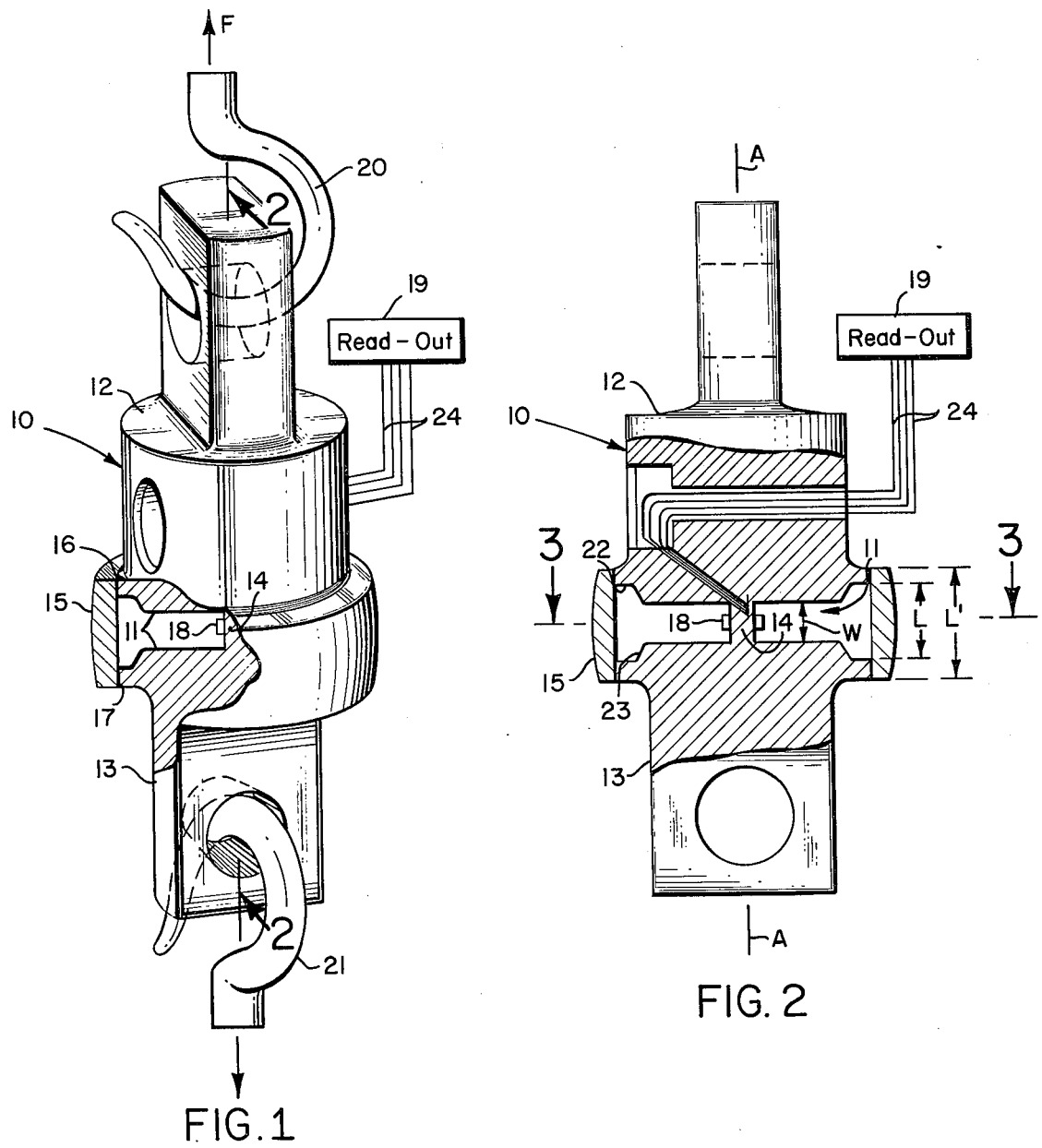
FIG. 1
FIG. 2
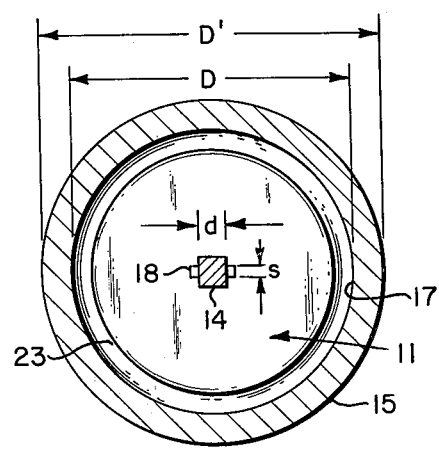
FIG. 3

HEAVY DUTY LOAD CELL

This invention relates generally to load cells and more particularly to an improved load cell constructed to indicate heavy duty loads in an axial direction, such as tension loads in a crane cable.

BACKGROUND OF THE INVENTION

Prior art load cells for measuring axial loads usually incorporate diaphragms or flexure webs connected to the force measuring element in order to isolate the force measuring element from side loads, torsion moments, and bending moments. These diaphragms are made thin and flexible in order not to carry load in the force measuring direction. Thus, they are inadequate to carry large side forces, torsion moments, and bending moments. As a consequence, extremely heavy side loads and moments such as encountered in a crane cable cannot be carried by the flimsy diaphragms or webs without risking rupture of the diaphragm or web structures themselves. These portions of the load cell simply cannot carry the shears and moments encountered in such an installation.

In addition to the foregoing limitations on the use of prior art load cells for indicating heavy axial loads, the output is not always proportional to the axial load in the presence of large side forces and moments. For example, in the case of measuring a tension load in the cable of a crane, the flexible cable can become twisted or distorted, thereby exerting large side forces and moments on the body of the load cell. These side forces and moments introduce substantial extraneous strains into the conventional load cells using diaphragms and webs for isolating the load measuring element.

Accordingly, in order to provide an accurate and consistene measurement of the axial load in the presence of extraneous forces, it is necessary to provide better isolation from these extraneous components.

BRIEF DESCRIPTION OF THE PRESENT INVENTION

With the foregoing in mind, it is a primary object of the present invention to provide an improved heavy duty load cell which avoids the use of flexure webs or diaphragms all to the end that there are eliminated weak or vulnerable portions in the load cell body which might rupture under extremely heavy loads.

A further important object of this invention is to provide a heavy duty load cell designed for measuring axial loads in such a manner that extraneous twisting or torsional, bending, and side load components are essentially eliminated from the measuring portion of the load cell so that a consistent and accurate indication of axial load only is provided.

Briefly, the foregoing is accomplished by providing an elongated integral body member having a circumferential recess between its opposite end portions leaving a centrally disposed axial column connecting the end portion. A ring in turn is coaxially aligned with the column and of an axial length greater than the width of the recess, the opposite inner ends of the ring being rigidly secured over 360° to the opposed circumferential edges of the end portions of the body member defined by the circumferential entrance of the recess. Strain gauge means are secured to opposite sides of the central portion of the column for connection to a read out device.

With the foregoing arrangement, the major portion of any axial load applied to the opposite end portions of the body is borne by the ring; whereas, extraneous tension, bending and side load components are absorbed by the heavy duty ring so that strains developed in the centrally disposed axial column are a function of only the load in an axial direction.

BRIEF DESCRIPTION OF THE DRAWINGS

A better understanding of the invention will be had by referring to the accompanying drawings in which:

FIG. 1 is a perspective view partly broken away showing the improved heavy duty load cell of this invention;

FIG. 2 is an elevational view of the load cell partly in cross section taken in the direction of the arrows 2—2 of FIG. 1; and FIG. 3 is a transverse cross section taken in the direction of the arrows 3—3 of FIG. 2.

DETAILED DESCRIPTION OF THE INVENTION

Referring first to FIG. 1, the heavy duty load cell includes an elongated integral body member designated generally by the numeral 10 having a circumferential recess 11 formed between its opposite end portions 12 and 13.

Essentially, the recess 11 constitutes an annular channel of a depth less than the radius of the body member so that there is left a centrally disposed axial column 14 connecting the end portions 12 and 13.

A ring member 15 is coaxially aligned with the column and is of an axial length greater than the width of the recess 11. As shown at 16 and 17, the opposite inner ends of the rings are rigidly secured over 360° to the opposed circumferential edges of the end portions 12 and 13 of the body member defined by the circumferential entrance edges of the recess 11.

Strain gauge means 18 are secured to opposite sides of the central portion of the column 14 for connection to a read out device 19.

The opposite end portions 12 and 13 may be formed with openings for receiving shackles such as indicated at 20 and 21 respectively in turn interposed between a crane cable or other load applying structure. The axial force applied to the cell is indicated by the letter F in FIG. 1.

Referring to FIG. 2, the components described in FIG. 1 are designated by the same numerals. In FIG. 2 it will be noted that the opposed circumferential edges of the end portions 12 and 13 at the circumferential entrance of the recess 11 are stepped in opposite axial directions as indicated at 22 and 23 so that the inner wall length designated L of the ring 15 in an axial direction between the secured inner opposite ends is greater than the width, designated W, of the recess so that the strains of the ring members 15 are substantially less than the strains of the column 14. Essentially, the width W of the recess corresponds to the axial length of the column 14 as shown.

In FIG. 2 the exterior axial length of the ring 15 is designated L', and the axial direction is defined by the axis A—A.

Referring now to the cross section of FIG. 3, it will be noted that in the embodiment disclosed, the centrally disposed axial column 14 is essentially square in cross section, its transverse dimension between opposite sides being indicated by the letter $d$. Preferably, the dimension $d$ is made as small as possible, its only restriction being that it be of sufficient size to accommodate the strain of gauge 18. In this respect, if the transverse dimension of the strain gauge is $s$, then $d$ is at least equal to $s$.

In FIG. 3 the stepped circumferential portion 23 is clearly shown as well as the inside of the outside diameters of the ring 15. These latter dimensions are designated by the letters D and D'.

The relative dimensions of components making up the load cell are designed such that under a heavy axial load either in compression or tension, the ring 15 will carry the major portion of the load. In this respect, the wall thickness of the ring given by the dimension D' minus D must be sufficient for the load involved and the length L must be such relative to the width of the recess W and thus the axial length of the column to assure that some strain which can be measured by the strain gauge means 18 will exist in the column. In one respect, the column 14 can be considered as a mechanical amplifier of axial strains developed in the ring under large tension or compression forces.

In order to increase the range of stress that can be developed in the centrally disposed axial column, the column itself may be preloaded in compression or tension when manufacturing the overall load cell depending upon the particular application of the load cell.

As an example of the foregoing if the application of the load cell is for measuring heavy duty tension forces as would be the case where it is used in a crane cable, it would be desirable to preload the centrally disposed axial column 14 in compression. Toward this end, the ring 15 would be heated and/or the body 10 cooled prior to securing the inner opposite circumferential ends of the ring to the opposed circumferential end portions of the body as at 16 and 17 as described in FIG. 1. When the ring and body arrive at an equal equilibrium temperature, the ring 15 will be placed in tension in an axial direction; that is, in the direction of the length L thereby placing the centrally disposed column 14 in compression. When the load cell is now used to measure a heavy axial load, the central column will be slowly decompressed from its pre-compression state through a neutral position and thence into a tension stress. A large range of axial loads can thus be indicated taking advantage of the linear relationship of load and strain through the zero or neutral strain condition.

In the event that the load cell is to be used to measure large compression forces; for example, the weight of a truck bed, the centrally disposed axial column 14 would be preloaded in tension. This preloading would then be accomplished by cooling of the ring 15 and/or heating of the load cell body prior to securing the ring to the load cell. When the ring and load cell reached an equal equilibrium temperature, the ring would be in compression in its axial direction thereby placing the column 14 in tension. Again, a compression load range would be accommodated by the column through its neutral strain condition thus again taking advantage of the linear relationship on either side of its neutral position.

The various relationships of the dimensions set forth in FIGS. 2 and 3 in the broadest aspect of the invention are defined by the following:

$2L<D<8L$
$0.1L<D'-D<L$
$0.1L<L'-L<L$
$L \leq W<4L$
$0.05L<d<0.5L$
$0.05L<s<0.5L$ In a preferred embodiment of the invention, the dimensions, within plus or minus 5 per cent, would have the following relationship:

$D = 3L$
$D' - D = 0.5L$
$L' - L = 0.75L$
$W = L$
$d = 0.2L$
$s = 0.2L$

OPERATION

In operation, it will be appreciated that the major portion of any axial load either in tension or compression will be borne by the ring member 15. Further, the centrally disposed axial column will only be strained in an axial direction because of the symmetry of the ring relative to the axial column about the axis A—A of FIG. 2. In other words, the ring will necessarily absorb any extraneous torsion, such as might occur in a twisting cable, bending forces and side load components. Thus, the strains developed in the centrally disposed axial column are a function of only the load in an axial direction to thereby provide a consistent and accurate read out of the axial load.

It will also be appreciated from the construction described, that the load cell is capable of accommodating extremely heavy or high loads in an axial direction since the ring member itself carries a substantial portion of the load as described. Thus, as opposed to prior art structures, the sensitive portion of the load cell which in the present case constitutes the centrally disposed axial column, is fully protected from the heavy loads applied to the cell itself.

Modifications falling within the scope and spirit of this invention will occur to those skilled in the art. The load cell is accordingly not be thought of as limited to the precise structure set forth for illustrative purposes.

What is claimed is:

1. A heavy duty load cell for measuring axial loads comprising, in combination:
   a. an elongated integral body member having a circumferential recess between its opposite end portions leaving a centrally disposed axial column connecting said end portion;
   b. a ring coaxially aligned with said column and of an axial length greater than the width of said recess, the opposite inner ends of said ring being rigidly secured over 360° to the opposed circumferential edges of said end portions of said body member defined by the circumferential entrance of the recess said centrally disposed axial column being preloaded in one direction by pre-loading said ring in an opposite axial direction at the time it is secured to said opposed circumferential end portions of said body member; and,
   c. strain gauge means secured to opposite sides of the central portion of said column for connection to a read out device
   whereby the major portion of an axial load applied to said opposite end portions of said body is borne by said ring, extraneous torsion bending and side load components being absorbed by said ring so that strains developed in said centrally disposed axial column are a function of only the load in an axial direction to thereby provide a consistent and accurate read out of the axial load.

2. A load cell according to claim 1, in which said opposed circumferential edges of said end portions of said body are stepped in opposite axial directions so that the inner wall length of said ring in an axial direction between the secured inner opposite ends is greater than the width of the recess and thus the axial length of said column.

3. A load cell according to claim 2, wherein if D is the inside diameter of said ring, D' the outside diameter of said ring, L the length of said ring in an axial direction as measured on its interior wall between said opposed circumferential edges, L' the length of said ring in an axial direction as measured on its exterior wall, W the axial width of said recess defining the axial length of said column, $d$ the transverse dimension of said column between opposite sides, and $s$ the transverse dimension of the strain gauge means, then:

$2L < D < 8L$
$0.1L < D' - D < L$
$0.1L < L' - L < L$
$L \leqslant W < 4L$
$0.05L < d < 0.05L$
$0.05L < s < 0.5L$ 4. A load cell according to claim 3, in which, within plus or minus five percent $D = 3L$
$D' - D = \mathbf{0.5L}$
$L' - L = \mathbf{0.75L}$
$W = L$
$d = \mathbf{0.2L}$
$s = \mathbf{0.2L}$ 5. A load cell according to claim 1, in which said centrally disposed axial column is pre-loaded in tension by preloading said ring in compression.

6. A load cell according to claim 1, in which said centrally disposed axial column is pre-loaded in compression by preloading said ring in tension.

* * * * *